Figure 1:
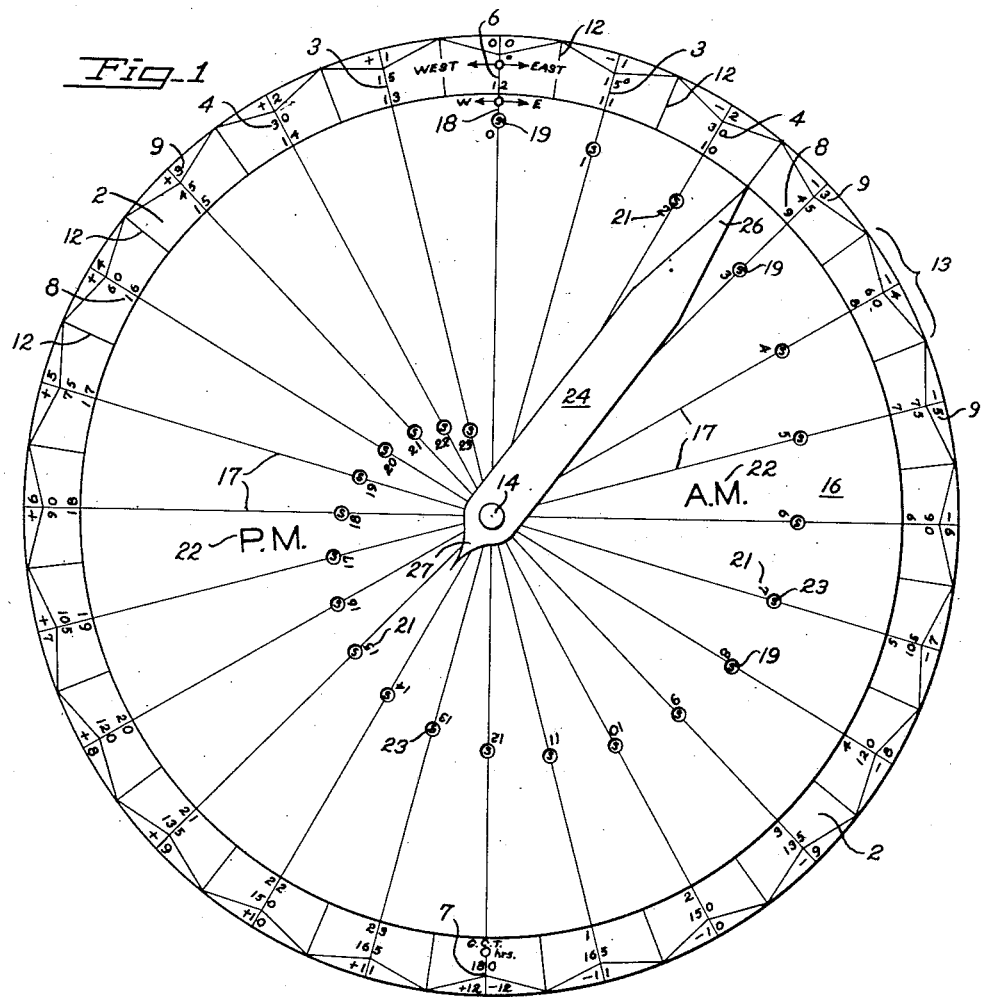

Nov. 16, 1954  G. K. STURGELL ET AL  2,694,522
GREENWICH TIME FINDER
Filed April 14, 1952  2 Sheets-Sheet 1

INVENTORS
GOLDEN K. STURGELL
WALTER M. THOMPSON
BY Charles S. Evans
their ATTORNEY Nov. 16, 1954  G. K. STURGELL ET AL  2,694,522
GREENWICH TIME FINDER
Filed April 14, 1952  2 Sheets-Sheet 2
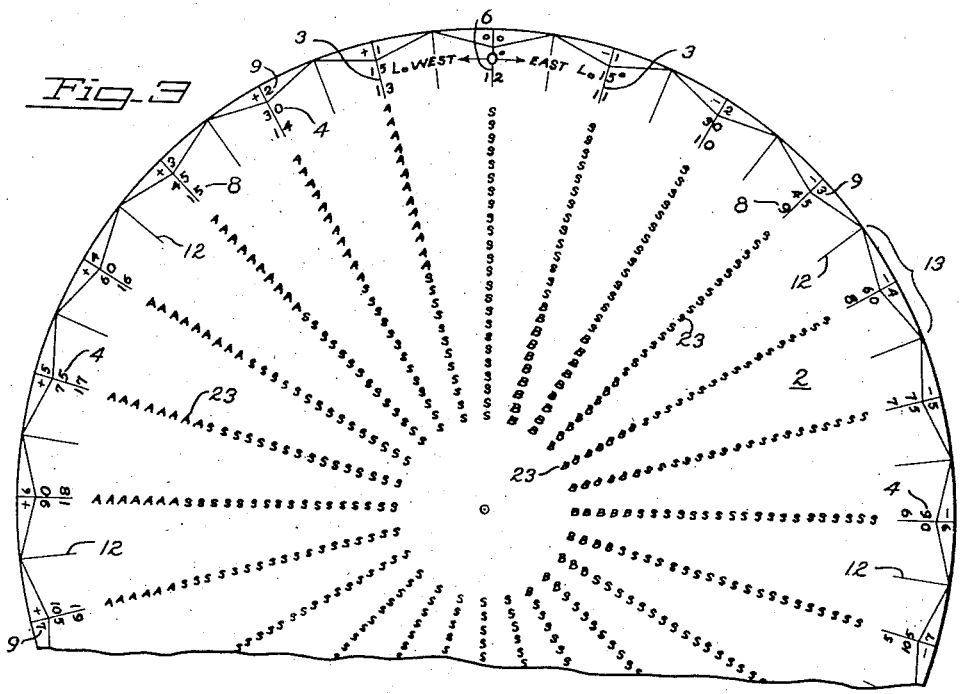
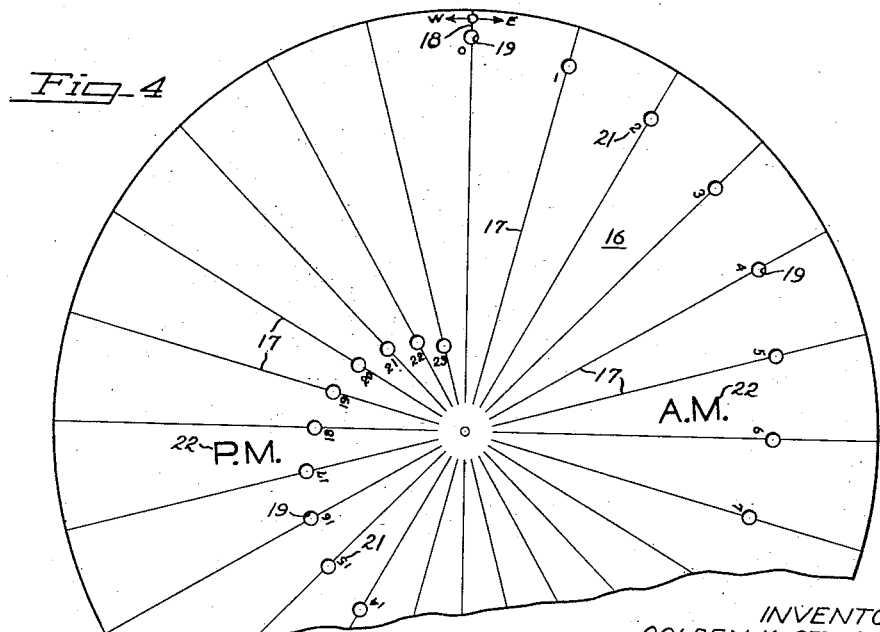
INVENTORS
GOLDEN K. STURGELL
WALTER M. THOMPSON
BY Charles S. Evans
their ATTORNEY

United States Patent Office 2,694,522
Patented Nov. 16, 1954

2,694,522

GREENWICH TIME FINDER

Golden K. Sturgell, Ben Lomond, and Walter M. Thompson, Palo Alto, Calif.

Application April 14, 1952, Serial No. 282,104

2 Claims. (Cl. 235—88)

Our invention relates to navigational aids; and particularly to an implement useful to the student of navigation.

It is among the objects of our invention to provide an implement for the student of navigation which will aid him in computing the time at the Greenwich meridian.

Another object is the provision of such an implement that will aid in simultaneously calculating the time and indicating the date at the Greenwich meridian.

Our invention possesses other objects and features of value, some of which, with the foregoing, will be set forth in the following description of our invention. It is to be understood that we do not limit ourselves to the showing made by the said description, and the drawings, as we may adopt variant forms of our invention within the scope of the appended claims.

Broadly considered, our invention comprises a base plate on which are printed radially extending lines representing meridians of longitude; and other radially extending lines representing the boundary lines of the twenty-four time zones into which the earth is divided; and which are bisected by the meridians above mentioned. Each of the meridians of longitude is identified by appropriate indicia indicating the distance of a selected meridian in degrees of arc, east or west of the Greenwich meridian. The radially extending lines representing the meridians are each further numbered to indicate their distance from the Greenwich meridian in terms of hours of longitude. These numbers also serve to identify the time zones, each of which is bisected by the meridians of longitude here employed.

Other indicia on the plate indicate Greenwich civil time in hours; the indicia in this case commencing with zero hours on the one-hundred and eightieth meridian and extending chronologically counterclockwise on the plate at each meridian until the one-hundred and eightieth meridian is again reached.

Superimposed on the plate and rotatable thereon is a disk also divided into twenty-four equal sectors by radial lines. The disk is provided with a plurality of apertures positioned spirally about its center so that an aperture interrupts each succeeding line starting with zero at shorter distances from the center. The apertures are identified by numbers from zero to twenty-three, and these numbers relate to hours of Greenwich civil time (G. C. T.).

Our implement is designed so that when the zero line of the disk is placed in alignment with a selected longitude on the plate, the apertures numbered from zero to twenty-three will display symbols indicating for any hour of the day at that selected longitude, whether it is the day "before," the "same" day, or the day "after" at Greenwich. A pointer rotatable about the same center as the disk points to the indicia on the plate indicating G. C. T. In the following description of our implement, the words East, West and North are applied as in a map to the figures.

Figure 2:
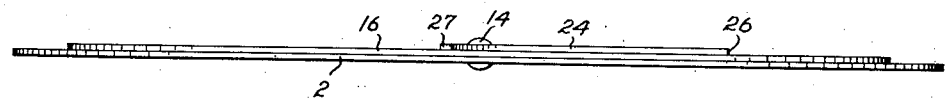

In the drawings, Fig. 1 is a plan view of our implement, with the disk positioned at zero degrees longitude and the pointer positioned at 9:30 G. C. T. Fig. 2 is an edge view of our implement showing the superposition of the plate, disk and pointer.

Fig. 3 is a plan view of the base plate, showing the various lines and indicia and the time indicating symbols; and Fig. 4 is a plan view of the disk detached from the plate. A portion of each of the figures is broken away to shorten the view.

In greater detail, our invention comprises a base plate 2, preferably circular in shape and conveniently formed from sheet plastic. The plate adjacent its periphery is provided with radially extending lines 3, preferably printed on the plate in a contrasting color, and representing meridians of longitude. Each of the lines, starting with the line directly north of center in Fig. 1, is evaluated by indicia 4, the indicia starting with zero, representing the Greenwich or prime meridian 6, and extending east and west of the prime meridian at intervals of fifteen degrees until the one-hundred and eightieth degree meridian 7 is reached.

Hours of G. C. T. are also indicated on the plate. The indicia 8, representing hours of G. C. T. start with zero hours on the one-hundred and eightieth meridian and extend counter-clockwise about the plate, the indicia representing each successive hour from zero to twenty-three and being positioned adjacent each of the meridians 3. It may be noted that the indicia indicating G. C. T. cover a period of twenty-four hours and that the hourly indicia run chronologically from zero to twenty-three. This is done in view of the fact that chronometers are numbered only from one to twelve, and do not indicate whether the hours are a. m. hours or p. m. hours. In our implement, both are evaluated with respect to a. m. and p. m. hours at the ship.

It is common knowledge among mariners in general and navigators particularly that for purposes of having a standard time in areas of the earth navigable by ships, the surface of the earth is divided into twenty-four equal time zones and that each of these time zones is identified by a zone number. The time zones each span an arc of the equator equal to fifteen degrees of longitude; or in terms of time, equal to one hour of longitude. Consideration of these time zones with reference to a given problem assumes that the zero zone is bisected by the prime meridian. Since there are twenty-four such time zones, each spanning an arc of fifteen degrees on the equator, and since the prime meridian bisects the zero time zone; meridians at intervals of fifteen degrees east and west of the prime meridian, will each bisect a time zone.

The zone numbers applied to the time zones extend from zero to twelve, starting with the zero zone and prime meridian, and extending to the lower branch of the prime meridian. The lower branch of the prime meridian bisects the number twelve zone.

For purposes of navigation, the zone numbers east of the prime meridian, are negative numbers (—1, —2 etc.) and the zone numbers west of the prime meridian are positive numbers; thus +1 indicates that the time is the standard time of the meridian bisecting zone one, that the zone lies west of Greenwich, and that the standard time for the zone is G. C. T. plus one hour.

In our implement, assuming the periphery of the plate to be the equator, indicia 9 are the zone numbers applied as described in the foregoing paragraph; and radially extending lines 12 represent the boundary lines of the time zones 13. Thus it will be seen in Figs. 1 and 3 that the meridians 3 bisect the time zones as defined by the radially extending lines 12.

Rotatably mounted on the plate by means of a rivet or grommet 14, is a disk 16. The disk is preferably formed of the same material as the plate; and is divided into twenty-four equal sectors by radial lines 17 and 18. The latter designates the zero line. The other radial lines 17 of the disk align themselves with the meridians 3 when the zero line is aligned with any selected meridian.

Each of the radial lines 17 is interrupted at a point spaced from the center by an aperture 19. The indicia on the disk adjacent the apertures and represented by the reference number 21, relate the apertures to hours of G. C. T. as indicated by the indicia 8 on the plate. The indicia adjacent the apertures extends consecutively from zero to twenty-three. The apertures are preferably positioned on the lines so that the distance of each aperture from the center 14 is decreased by a fixed amount equal to at least one-twenty-fourth of the distance between the first or zero aperture and the aperture numbered twenty-three, measured in a vertical line.

Preferably, the two halves of the disk are differentiated by color. As viewed in Fig. 1, the right half of the disk is considered to be the a. m. half, and the left side of the disk the p. m. half. Appropriate indicia 22, in addition to the differentiation afforded by different colors, reminds the student of the character given each half of the disk.

With the disk positioned as shown in Fig. 1, it will be seen that symbols 23 are displayed through the apertures 19. The symbols 23 are printed on the plate in lines or series radiating from the center, and represent the first letter of the words "before," "same," and "after." When the zero line of the disk is aligned with any selected meridian line 3, the symbols displayed through the apertures will indicate for any hour of the twenty-four, at that longitude, whether it is the day "before," the "same" day or the day "after" at Greenwich.

For determining whether it is a. m. or p. m. at Greenwich, a pointer 24, rotatable about the same center as the disk, is used. The pointer is formed so that the point 26 points directly to the indicia 8 giving hours of G. C. T. as read on the chronometer. The short point 27 on the other end of the pointer, points to the G. C. T. twelve hours removed from that pointed out by the point 26.

In operation, the disk is rotated until the zero line 18 is in line with a selected meridian line 3 denoting the longitude. The longitude selected may be any longitude from zero to one-hundred and eighty degrees east or west. With the disk so positioned, the pointer is rotated to place the point 26 opposite the indicia 8 denoting G. C. T. as indicated by the chronometer on board the ship. From visual observation, it is then deduced whether it is a. m. or p. m. at the ship.

If it is p. m. at the ship and the G. C. T. denoted by the point 26 falls within the p. m. half of the disk, the symbol displayed in the aperture numbered to correspond with the G. C. T. pointed out will indicate whether the date at Greenwich is the day "before," the "same" day, or the day "after" the day at the ship for the particular time pointed out. The same will be true if it is a. m. at the ship and the G. C. T. pointed out falls within the a. m. half of the disk.

If, however, the G. C. T. is unknown, but the longitude and zone time are known, putting the point 26 on the longitude will indicate by how many hours and in what direction the zone time must be modified to render G. C. T. When the G. C. T. is found, the date at Greenwich may be found as previously described.

If it is p. m. at the ship and the G. C. T. denoted by the point 26 falls within the a. m. half of the disk, the symbol displayed in the aperture numbered to correspond with the G. C. T. denoted by point 27, will indicate the date. It will be noted that in this case the G. C. T. diametrically opposite to that pointed to by the point 26 is used. The same is true if it is a. m. at the ship and the G. C. T. denoted by point 26 falls within the p. m. half of the disk.

We claim:

1. An implement for aiding the study of navigation comprising a base plate having a center and divided by radially extending lines into twenty-four even sectors, each sector representing one hour of longitude and bearing indicia, said indicia on sectors on each side of a selected radially extending line denoting the distance progressively in degrees of arc from said selected radially extending line, said selected radially extending line representing the prime meridian of longitude, a disk mounted on the base plate for circular movement about said center and divided by radial lines into twenty-four equal sectors, said radial lines bearing indicia from zero to twenty-three inclusive and said disk having an aperture on each said radial line, said apertures arranged at different distances from the rotational center of said disk, and time indicating symbols disposed on the base plate and displayed through said apertures when the zero radial line of the disk is aligned with a selected radially extending line of the base plate.

2. An implement for aiding the study of navigation comprising a base plate having a center and divided by radially extending lines into twenty-four even sectors, each sector representing one hour of longitude and bearing indicia, said indicia on sectors on each side of a selected radially extending line denoting the distance progressively in degrees of arc from said selected radially extending line, said selected radially extending line representing the prime meridian of longitude, a disk mounted on the base plate for circular movement about said center and divided by radial lines into twenty-four equal sectors, said radial lines bearing indicia from zero to twenty-three inclusive and said disk having an aperture on each said radial line, said apertures arranged at different distances from the rotational center of said disk, time indicating symbols disposed in radially extending series on the base plate coextensive with said radially extending lines and displayed through said apertures when the zero radial line of the disk is aligned with a selected radially extending line of the plate, and a pointer mounted on the center and rotatable thereon for pointing out indicia on the plate representing hours of time.

References Cited in the file of this patent

UNITED STATES PATENTS

| Number | Name | Date |
|---|---|---|
| 2,039,921 | Murphy | May 5, 1936 |
| 2,042,615 | Maxson | June 2, 1936 |
| 2,418,756 | Christy | Apr. 8, 1947 |